US012776685B2

(12) United States Patent
Tang

(10) Patent No.: US 12,776,685 B2
(45) Date of Patent: Oct. 27, 2026

(54) INTEGRATED TWO PHASE COOLING SLEEVE

(71) Applicant: Honeywell International Inc., Charlotte, NC (US)

(72) Inventor: Benjamin Tang, Monterey Park, CA (US)

(73) Assignee: Honeywell International Inc., Charlotte, NC (US)

( * ) Notice: Subject to any disclaimer, the term of this patent is extended or adjusted under 35 U.S.C. 154(b) by 109 days.

(21) Appl. No.: 18/609,873

(22) Filed: Mar. 19, 2024

(65) Prior Publication Data

US 2025/0300526 A1 Sep. 25, 2025

(51) Int. Cl.
*H02K 9/20* (2006.01)
*F04D 29/58* (2006.01)

(52) U.S. Cl.
CPC ........... *H02K 9/20* (2013.01); *F04D 29/5806* (2013.01)

(58) Field of Classification Search
CPC ....... H02K 9/20; H02K 5/203; F04D 29/5806
See application file for complete search history.

(56) References Cited

U.S. PATENT DOCUMENTS

| | | | | |
|---|---|---|---|---|
| 3,684,906 | A * | 8/1972 | Lenz | H02K 17/16 310/61 |
| 4,035,112 | A | 7/1977 | Hackbarth et al. | |
| 10,700,572 | B2 | 6/2020 | Weber et al. | |
| 10,770,949 | B2 | 9/2020 | Scharlach | |
| 11,356,001 | B2 | 6/2022 | Huber et al. | |
| 2021/0190395 | A1* | 6/2021 | Heisy et al. | F25B 1/10 |
| 2021/0313858 | A1* | 10/2021 | Sung et al. | H02K 9/193 |
| 2022/0302795 | A1 | 9/2022 | Barden et al. | |
| 2023/0010555 | A1 | 1/2023 | Tang et al. | |
| 2023/0015125 | A1 | 1/2023 | Tang et al. | |

FOREIGN PATENT DOCUMENTS

| | | | | |
|---|---|---|---|---|
| DE | 102022112415 | A1 * | 11/2023 | H02K 5/203 |
| EP | 3542448 | A1 | 9/2019 | |
| KR | 20240174369 | A * | 6/2023 | F04D 29/284 |
| WO | 2018091721 | A1 | 5/2018 | |

OTHER PUBLICATIONS

KR 20240174369 A Translation (Year: 2023).*
DE 102022112415 A1 Translation (Year: 2023).*
Extended Search Report from counterpart European Application No. 25162347.6 dated Jul. 16, 2025, 11 pp.
Communication pursuant to Article 94(3) EPC from counterpart European Application No. 25162347.6 dated Mar. 23, 2026, 9 pp.
Response to Extended Search Report dated Jul. 16, 2025, from counterpart European Application No. 25162347.6 filed Sep. 15, 2025, 32 pp.
Response to Communication pursuant to Article 94(3) EPC dated Mar. 23, 2026, from counterpart European Application No. 25162347.6, filed May 5, 2026, 30 pp.

* cited by examiner

*Primary Examiner* — Jerry-Daryl Fletcher
*Assistant Examiner* — Dario Antonio Deleon
(74) *Attorney, Agent, or Firm* — Shumaker & Sieffert, P.A.

(57) ABSTRACT

In some examples, a rotary mechanical system, includes a motor, a housing, and a plurality of cooling channels. The housing at least partially encloses one or more components of the motor. The plurality of cooling channels are defined by a plurality of spaces between an external surface of the motor and an inner surface of the housing, and are configured to receive a refrigerant to cool the motor.

20 Claims, 6 Drawing Sheets

INTEGRATED TWO PHASE COOLING SLEEVE

TECHNICAL FIELD

The disclosure relates to components of rotary motors.

BACKGROUND

A rotary system, e.g., a rotary motor, may generate heat during operation. A cooling jacket may be provided within the housing of the motor that allows a cooling fluid to transfer heat from the motor to the cooling fluid, improving operation of the rotary motor.

SUMMARY

A rotary motor, for example a compressor motor in a vapor cycle system, may generate heat during operation. One or more cooling channels may be disposed within a housing of the rotary motor configured to allow a cooling fluid to pass over one or more parts of the motor and transfer heat away from the motor. In this way, the operation and longevity of the motor is improved.

In some examples, a rotary mechanical system includes a motor; a housing, wherein the housing at least partially encloses one or more components of the motor; and a plurality of cooling channels defined by a plurality of spaces between an external surface of the motor and an inner surface of the housing, wherein the plurality of cooling channels are configured to receive a refrigerant to cool the motor.

In some examples, a vapor cycle system includes: a condenser including a condenser outlet; a compressor, including: a motor; a housing, wherein the housing at least partially encloses one or more components of the motor; and a plurality of cooling channels defined by a plurality of spaces between an external surface of the motor and an inner surface of the housing, wherein the plurality of cooling channels are in fluid communication with the condenser outlet, and wherein the plurality of cooling channels are configured to receive a refrigerant from the condenser to cool the motor.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
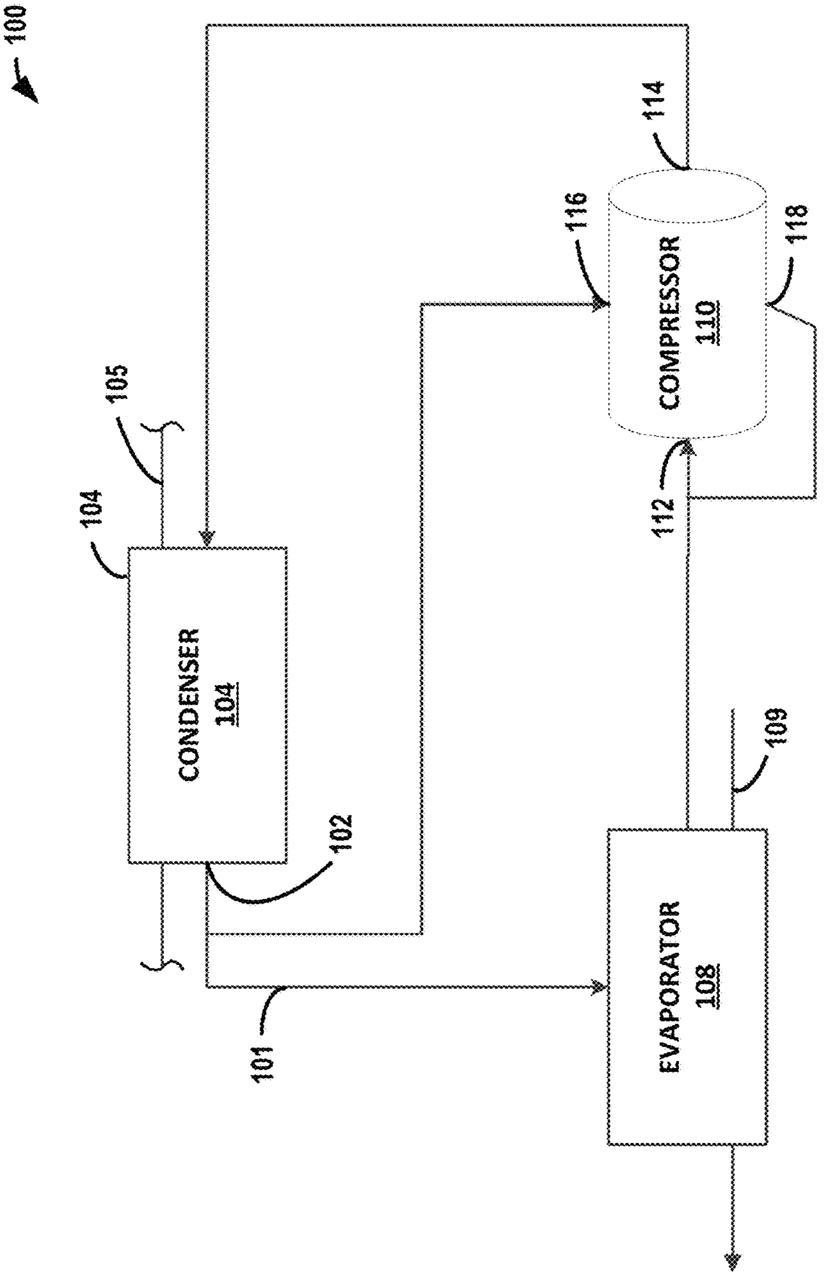
FIG. 1 is a conceptual diagram illustrating an example vapor cycle system, in accordance with the techniques of this disclosure.

The disclosure describes rotary mechanical systems with consolidated internal cooling components. Existing rotary mechanical systems (e.g., electric motors, compressors) may include a cooling sleeve disposed within a housing of the system between the housing and the motor. The cooling sleeve may provide one or more channels through which cooling fluid may pass to draw heat away from the motor. The cooling sleeve is typically a separate component from the housing and the motor that must be separately fabricated and assembled into the housing. The addition of the cooling sleeve adds time and cost to the assembly of the rotary motor and increases the size of the housing.

According to examples of the present disclosure, a rotary mechanical system may integrate a cooling sleeve into the housing of the rotary mechanical system. For examples, the housing may be machined to include the one or more channels through which the cooling fluid may flow, without the need for a separate cooling sleeve. The examples of the present disclosure save time during manufacture and assembly of the rotary mechanical systems, and reduce the overall necessary size of such systems.

In some examples, the rotary mechanical system is a compressor for a vapor cycle system (VCS). A VCS may be configured to cool a thermal load (e.g., air) using a system fluid (e.g., refrigerant). The VCS may generally include a compressor, a condenser, and an evaporator through which a cooling medium (i.e., the system fluid) flows. The compressor may compress and pressurize the system fluid, aiding flow within the system and supplying the condenser with a relatively high temperature, gaseous form of the system fluid. The condenser transfers heat away from the system fluid (e.g., to the surrounding air or other fluid). This heat exchange causes the system fluid to undergo a phase change from a gas to a liquid. The evaporator may receive the system fluid after the condenser. Inside the evaporator, the liquid system fluid expands through a valve or an orifice, reducing its pressure and causing it to rapidly evaporate. This phase change from liquid to gas requires heat energy, which is extracted from the surrounding thermal load (e.g., air or other substance being cooled). After extracting heat energy from the thermal load in the evaporator, the system fluid may return to the compressor for another cycle.

After exiting the condenser, a small portion of the system fluid may be directed to a cooling inlet of the compressor housing. The cooling inlet may be in fluid communication with one or more cooling channels within the housing between the housing and the motor. As described in more detail below, the cooling channels may be integrated with the housing. As the system fluid passes through the one or more cooling channels, the system fluid may draw heat away from the motor. A cooling outlet may allow the system fluid to flow back out of the cooling channels and into the compressor inlet to be recycled in the VCS.

FIG. 1 is a conceptual diagram illustrating an example vapor cycle system 100, in accordance with the techniques of this disclosure. System 100 includes compressor 110, condenser 104, and evaporator 108. System 100 may be configured to cool thermal load 109. For example, thermal load 109 may represent an air supply line filled with air to be cooled. In some examples, system 100 may include other components not featured in FIG. 1, for example a filter drier, one or more expansion valves, and/or a flash heat exchanger between condenser 104 and evaporator 108. Furthermore, in some examples system 100 may include a plurality of pressure sensors, temperature sensors, valves, and wiring throughout system 100. System 100 may also include one or more control units configured to control components of system 100, for example a motor controller to control a motor of compressor 110.

The one or more fluid connections 101 of system 100 may be filled with refrigerant (i.e., the system fluid) that undergoes a vapor cycle as the refrigerant progresses through system 100 in order to cool thermal load 109, as depicted by the lines and arrows between compressor 110, condenser 104, and evaporator 108. For example, compressor 110 may be configured to pressurize the refrigerant, causing the refrigerant to travel through system 100. Condenser 104 may be configured to cool the refrigerant. One or more expansion devices may be configured to control a flow rate of the refrigerant through system 100. Evaporator 108 may be configured to cool thermal load 109.

Condenser 104 may be fluidically coupled to, and in series with, compressor 110 such that the refrigerant flows from an outlet 114 of compressor 110 to an inlet of condenser 104 and through condenser 104. Condenser 104 may be fluidically coupled to cooling source 105 to provide heat transfer from the refrigerant to cooling source 105. Condenser 104 may be configured to receive vapor refrigerant from compressor 110, condense the vapor refrigerant, and discharge the refrigerant. In some examples, outlet 102 of condenser 104 may be in fluid communication with evaporator 108. In some examples, refrigerant may flow from outlet 102 of condenser 104 through a series of other components of system 100 before reaching evaporator 108, e.g., a filter drier, one or more expansion devices, and/or a flash heat exchanger. In some examples, condenser 104 is cooled by environmental air, such as ram air flow.

A motor of compressor 110 may generate heat during operation. The motor may be cooled in order to prolong the life of the motor and increase the efficiency of the motor. As shown in FIG. 1, outlet 102 of condenser 104 may be fluidically coupled to a cooling flow inlet 116 on compressor 110. The cooling flow inlet 116 may allow refrigerant to enter a motor housing of compressor 110 to cool the motor of compressor 110. In some examples, cooling flow inlet 116 may include a control orifice configured to meter the flow of refrigerant into the housing. That is, the control orifice may control an amount (e.g., mass over time, volume over time, etc.) of refrigerant that enters the housing. For example, the control orifice may include a valve attached to or within cooling flow inlet 116.

After the refrigerant has cooled the motor, compressor 110 may be configured to allow the refrigerant to After the refrigerant has passed through the motor housing and cooled the motor, it may exit the housing through cooling flow outlet 118. Cooling flow outlet 118 may be fluidically coupled to compressor inlet 112, allowing the refrigerant to be cycled back through vapor cycle system 100.

The example of FIG. 1 is meant to be exemplary and should not be considered limiting as to the components of system 100. In some examples, system 100 may have more components than shown in FIG. 1. For example, system 100 may include one or more expansion devices, flash heat exchangers, pressure sensors, temperature sensors, and/or other components known in the art for operation of a vapor cycle system. Although FIG. 1 shows a vapor cycle system, a rotary mechanical system (e.g., compressor 110) may be part of any system. In some examples, a rotary mechanical system may be any electric motor.

Figure 2:
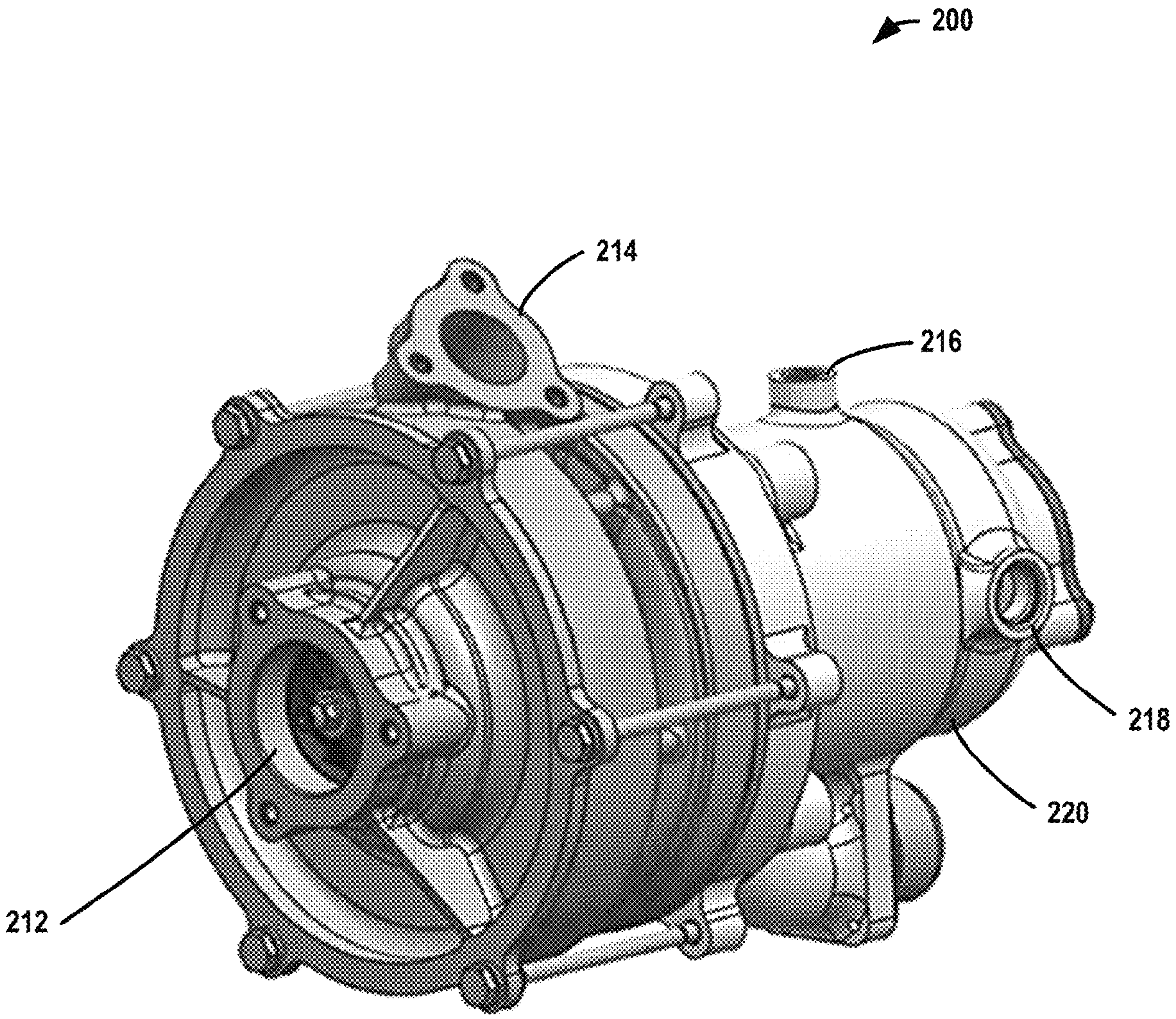
FIG. 2 is an isometric view of an example rotary mechanical system, in accordance with the techniques of this disclosure.

FIG. 2 is an isometric view of example rotary mechanical system 200, in accordance with the techniques of this disclosure. In the example of FIG. 2, rotary mechanical system 200 is a compressor with inlet 212 and outlet 214. Inlet 212 and outlet 214 may be substantially similar to compressor inlet 112 and compressor outlet 114, respectively, of FIG. 1. In some examples, rotary mechanical system 200 is a compressor of a VCS (e.g., VCS 100 of FIG. 1). Rotary mechanical system 200 includes cooling flow inlet 216 and cooling flow outlet 218 on stator housing 220.

Rotary mechanical system 200 may include an electric motor to drive rotary mechanical system 200. The rotor of rotary mechanical system 200 may be mounted on a shaft disposed in the center of rotary mechanical system 200 along a length of rotary mechanical system. In some examples, rotor may have a laminated iron core with conductive windings. In some examples, the rotor consists of a solid metallic core.

Stator housing 220 may include may at least partially enclose one or more components of a motor of rotary mechanical system 200. For example, stator housing 220 may house the stator of rotary mechanical system 200. The stator may be disposed in rotary mechanical system 200 around the rotor. The stator may include a series of coils or windings made of insulated copper wire. These windings may be distributed in slots around the stator core. When an electric current flows through the stator windings, it generates a magnetic field. As the stator's magnetic field interacts with the rotor, it may induce a torque that causes the rotor to turn. This rotational motion is transferred to the compressor through the shaft.

When electric current flows through the stator windings, the stator may generate heat. The stator may be cooled in order to prolong the life and increase the efficiency of the motor. Stator housing 220 may include a plurality of cooling channels defined by a plurality of spaces between an external surface of the stator and an inner surface of stator housing 220. Rotary mechanical system 200 may be configured to receive a liquid refrigerant through cooling flow inlet 216 to cool the stator. After cooling the stator, the refrigerant may exit stator housing 220 through cooling flow outlet 218 and be directed to inlet 212.

Figure 3:
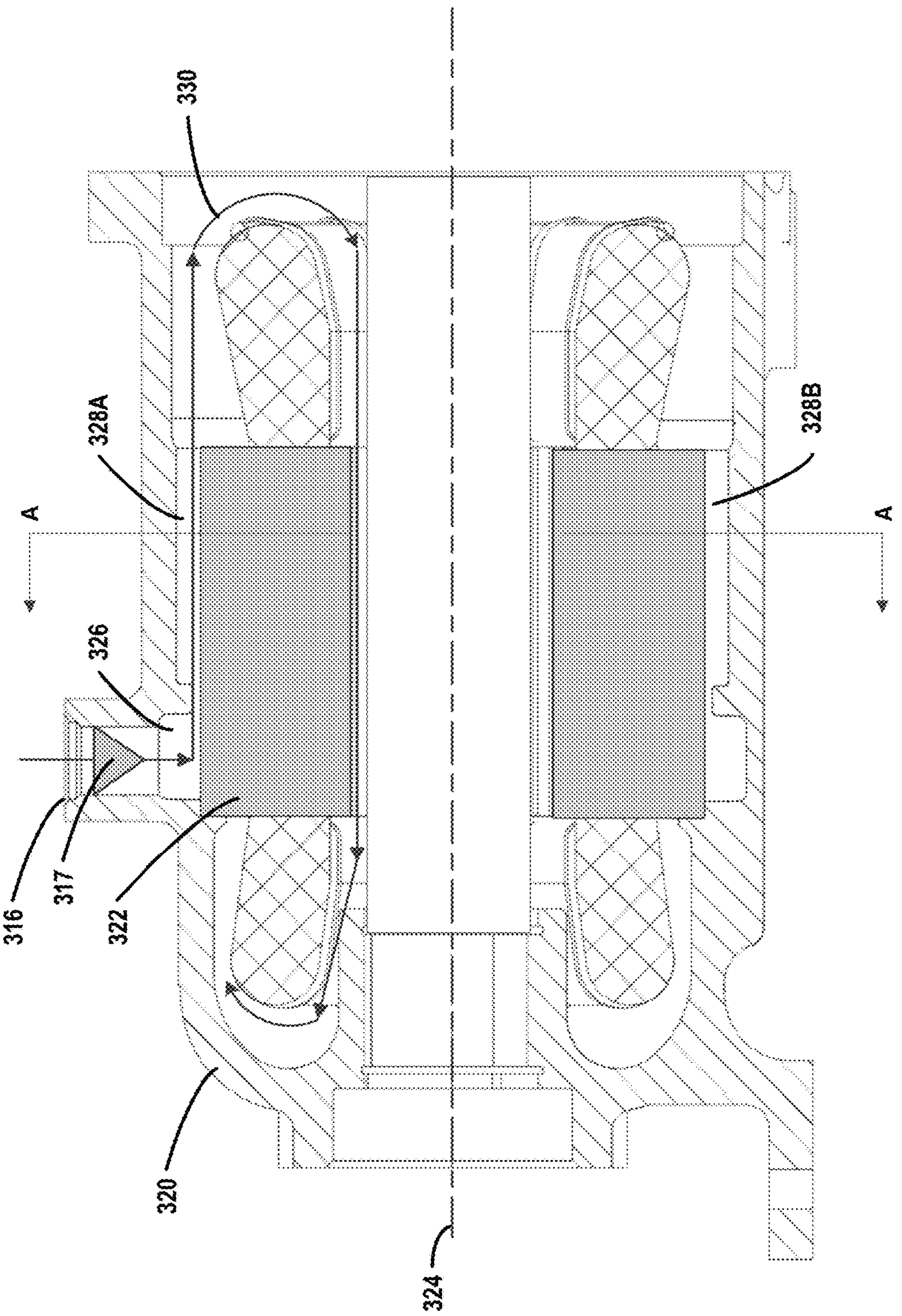
FIG. 3 is a cross-sectional side view diagram of an example stator housing and stator, in accordance with the techniques of this disclosure.

FIG. 3 is a cross-sectional side view diagram of an example stator housing 320 and stator 322, in accordance with the techniques of this disclosure. Stator housing 320 may be substantially similar to stator housing 220 of FIG. 2. Stator housing 220 may include cooling flow inlet 316 configured to receive refrigerant for cooling stator 322. In some examples, cooling flow inlet 316 may be fluidically coupled to an outlet of a condenser of a VCS, and may receive liquid refrigerant from the condenser. Stator housing 320 may include one or more cooling channels 328A and 328B (together, cooling channels 328) configured to receive the refrigerant from distribution channel 326, via one or more orifices in the flow path between distribution channel 326 and cooling channels 328.

Cooling channels 328 may be defined by a plurality of spaces between an external surface of stator 322 and an inner surface of stator housing 320. That is, in the example of FIG. 3, cross section A-A represents a cross-section of stator 322 and stator housing 320 perpendicular to longitudinal axis 324. When viewed from cross-section A-A (as in the example of FIGS. 5 and 6), cooling channels 328 may be bounded by an external surface of stator 322 and an inner surface of stator housing 320. For example, cooling channels

328 may be machined into stator housing 320, e.g., machined into an inner surface of stator housing 320, such that when stator 322 is inserted into stator housing 320, cooling channels 328 become defined.

Stator housing 320 and stator 322 may be configured to allow the refrigerant to flow generally along path 330 within stator housing 320. Path 330 of FIG. 3 is marked intermittently with arrows to show a general flow direction of the refrigerant within stator housing 320. Stator housing 320 may receive the refrigerant through cooling flow inlet 316. Thereafter, distribution channel 326, which is in fluid communication with cooling flow inlet 316, may receive the refrigerant from cooling flow inlet 316. Cooling channels 328 may thereafter receive the refrigerant from distribution channel 326 through one or more orifices. In some examples, path 330 of the refrigerant travels substantially around the entirety of a stator 322. That is, except for a portion of stator housing 320 which blocks flow of the refrigerant in one direction, the refrigerant may travel along path 330 to make contact with each side of stator 322. In some examples, seventy-five percent of an outer surface of stator 322 may contact the refrigerant while the refrigerant flows through stator housing 320. In some examples, seventy-five to ninety-five percent of an outer surface of stator 322 may contact the refrigerant while the refrigerant flows through stator housing 320. It may be understood that path 330 represents a general direction of flow of the refrigerant in stator housing 320, and that refrigerant may flow in different directions within local regions inside stator housing 320.

As seen in FIG. 3, path 330 of the refrigerant as it cools stator 322 may travel from cooling flow inlet 316 substantially parallel to longitudinal axis 324 on an external surface of stator 322. That is, with reference to FIG. 3, the refrigerant may travel through to the right through cooling channels 328. Thereafter, path 330 may curves around an end of stator 322 and travels in the opposite direction along longitudinal axis 324 on an inner surface of stator 322. Afterwards, following this path, refrigerant may exit stator housing 320 via a cooling flow outlet (e.g., cooling flow outlet 218 of FIG. 2). In this way, stator housing 320 and stator 322 may increase contact with the refrigerant and increase heat draw away from stator 322. In some examples, cooling flow inlet 316 may receive the refrigerant as a liquid. In some examples, cooling flow inlet 316 may receive the refrigerant as a gas. In some examples, the refrigerant may enter stator housing 320 as a liquid, and exit stator housing 320 at least partially as a gas.

Stator 322 and stator housing 320 may both define longitudinal axis 324. That is, stator housing 320 may be substantially cylindrical in shape and may include a length that defines longitudinal axis 324 along a center of the cylinder extending along the length. Similarly, stator 322 may be substantially cylindrical in shape and may include a length that defines longitudinal axis 324 along the center of the cylinder extending along the length. The cylinders of housing 320 and stator 322 may be concentric such that the longitudinal axis defined by stator housing 320 is coextensive with the longitudinal axis defined by stator 322. In some examples, stator 322 and stator housing 320 may not define the exact same longitudinal axis along their length. For example, machining tolerances or assembly tolerances may result in slightly different longitudinal axes defined by stator 322 and stator housing 320. It may be understood that these small differences result in a stator 322 and stator housing 320 that are substantially concentric and have substantially parallel longitudinal axes.

Distribution channel 326 may act as a reservoir of refrigerant for cooling channels 328. For example, distribution channel 326 may include a recess in stator housing 320 that extends around the entire inner circumference of stator housing 320. That is, distribution channel 326 as shown in FIG. 3 may exist as an open space through an entire rotation about longitudinal axis 324 in stator housing 320. Distribution channel 326 may be sized to allow the refrigerant to flow through each of cooling channels 328. If distribution channel 326 is not properly sized, refrigerant may flow primarily along a path of least resistance through stator housing 320, and may not flow sufficiently through each cooling channel of cooling channels 328 to provide the desired cooling effect. For example, if distribution channel 326 is not properly sized, refrigerant may flow heavily through cooling channel 328A closest to cooling flow inlet 316, and flow very faintly (or not at all) through cooling channel 328B farthest away from cooling flow inlet 316. Distribution channel 326 may be sized sufficiently larger than the one or more orifices between distribution channel 326 and cooling channels 328 such that refrigerant may flow through distribution channel 326 to an orifice in stator housing 320 farthest away from cooling flow inlet 316. For example, the one or more orifices may restrict the flow of refrigerant with respect to flow of refrigerant through distribution channel 326 such that refrigerant may fill an entirety of distribution channel 326 and act as a refrigerant pressure source for each of cooling channels 328.

In some examples, cooling flow inlet 316 may include control orifice 317 configured to meter the flow of refrigerant into the housing. For example, control orifice 317 may be a portion of the piping with a reduced cross-sectional area to limit fluid flow. In some examples, control orifice 317 may include a valve attached to or within cooling flow inlet 316. The valve may be manually adjustable to meter the flow of refrigerant into the housing. In some examples, the valve may automatically adjust based on the flow rate of refrigerant leading up to cooling flow inlet 316 in order to ensure a consistent flow of refrigerant through cooling flow inlet 316.

The refrigerant may consist of any two-phase refrigerants that are not electroconductive. The refrigerant may be non-electroconductive to reduce potential electric current from the motor passing through the refrigerant. In some examples, the refrigerant may consist of one or more of a hydrochlorofluorocarbon, a hydrofluorocarbon, a hydrocarbon, an azeotropic blend, a hydrofluoroolefin, ammonia, or other refrigerant. In some examples, the refrigerant may consist of one or more of R134a (tetrafluoromethane), R-1233zd, or R-1234yf.

Figure 4:
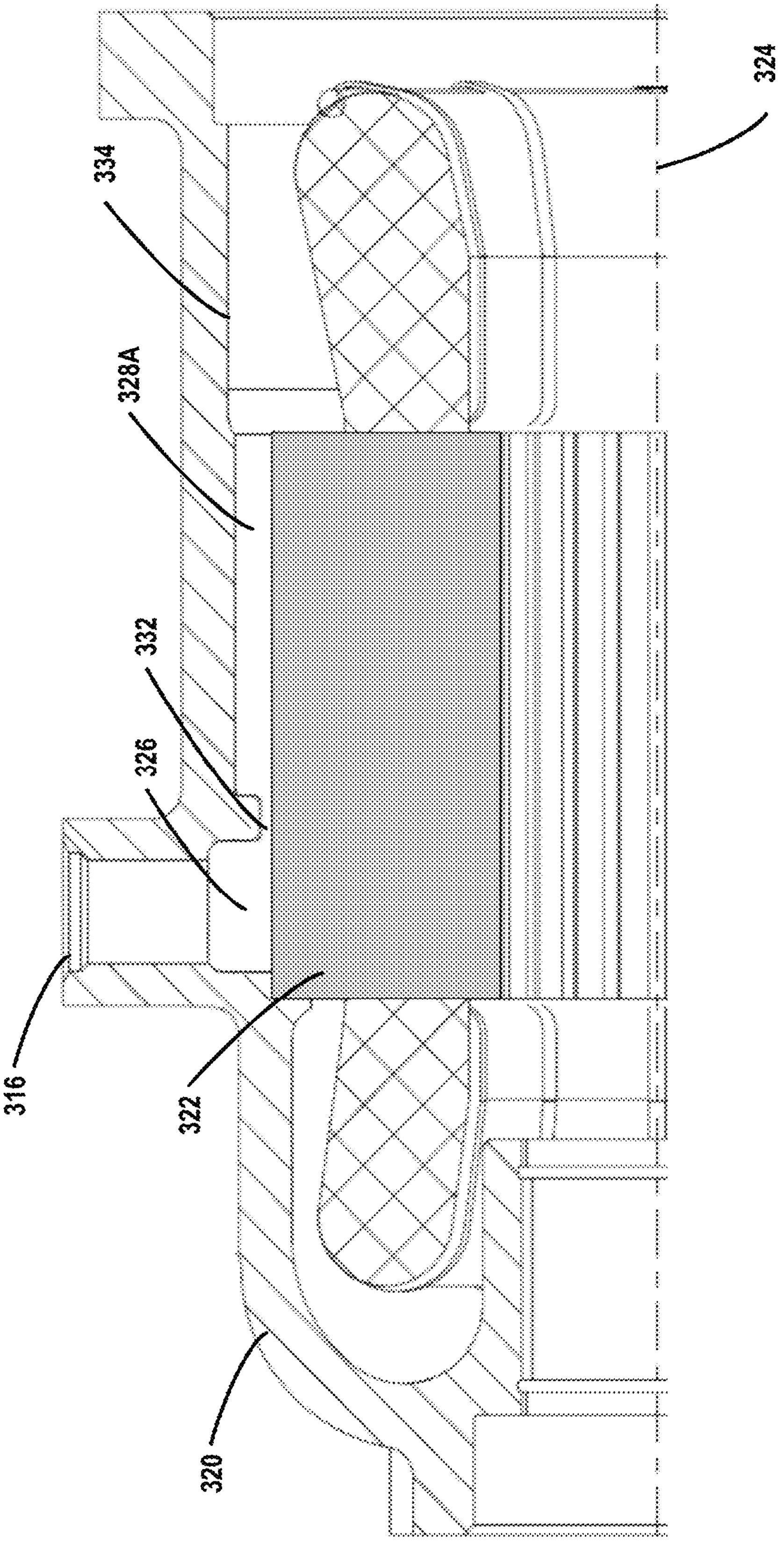
FIG. 4 is a zoomed-in view of the example stator housing and stator of FIG. 3, in accordance with the techniques of this disclosure.

FIG. 4 is an enlarged view of the example stator housing 320 and stator 322 of FIG. 3, in accordance with the techniques of this disclosure. Stator housing 320 may also include one or more orifices (e.g., orifice 332), distribution channel 326 and cooling channels 328. The one or more orifices may be configured to restrict flow of the refrigerant from distribution channel 326 to cooling channels 328. For example, the one or more orifices may be sized to allow the refrigerant to flow through each of cooling channels 328.

If the one or more orifices are not properly sized, refrigerant may flow primarily along a path of least resistance through stator housing 320, and may not flow sufficiently through each cooling channel of cooling channels 328 to provide the desired cooling effect. For example, if orifice 332 is too large with respect to distribution channel 326, refrigerant may flow heavily through cooling channel 328A closest to cooling flow inlet 316, and flow very faintly (or not at all) through cooling channel 328B farthest away from cooling flow inlet 316. The one or more orifices (e.g., orifice 332) may be sized sufficiently smaller than distribution channel 326 such that refrigerant may flow through distribution channel 326 to an orifice in stator housing 320 farthest away from cooling flow inlet 316. For example, orifice 332 may restrict fluid flow such that refrigerant is allowed to flow through distribution channel 326 to the portion of distribution channel 326 farthest away from cooling flow inlet 316 and remain sufficiently pressurized to urge through an orifice farthest away from cooling flow inlet 316 and thereafter through cooling channel 328B. The one or more orifices may restrict the flow of refrigerant with respect to flow of refrigerant through distribution channel 326 such that refrigerant may fill an entirety of distribution channel 326 and allow refrigerant within distribution channel 326 to act as a refrigerant pressure source for each of cooling channels 328.

Figure 5:
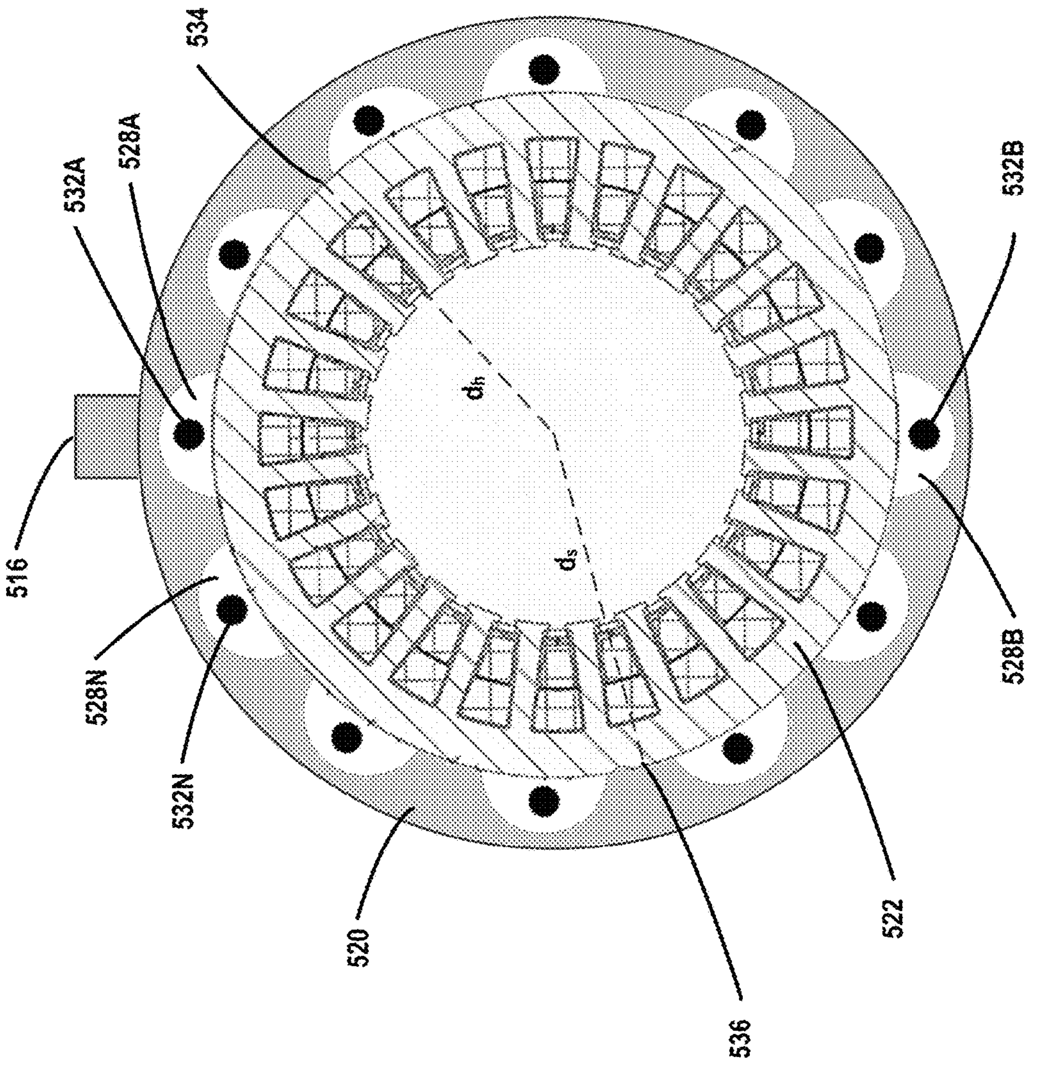
FIG. 5 is a cross-sectional axial view diagram of an example stator housing and a plurality of example orifices formed in the stator housing, in accordance with the techniques of this disclosure.
Figure 6:
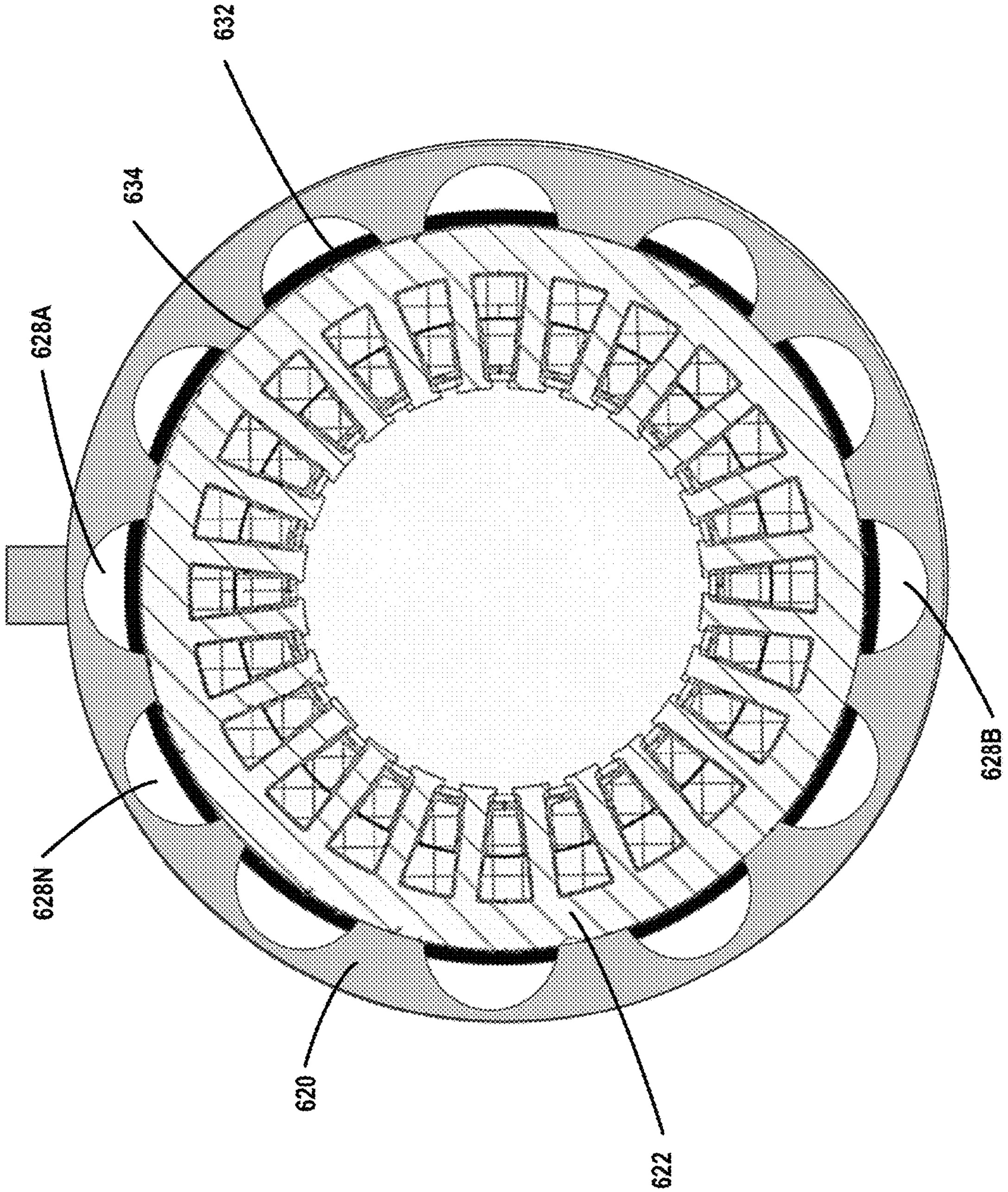
FIG. 6 is a cross-sectional axial view diagram of an example stator housing with an undercut formed in the stator housing, in accordance with the techniques of this disclosure.

In some examples, stator housing 320 may include a single undercut that acts as an orifice for each cooling channel of cooling channels 328. For example, orifice 332 may include a recess in stator housing 320 that extends around the entire inner circumference of stator housing 320. That is, orifice 332 as shown in FIG. 4 may exist as an open space through an entire rotation about longitudinal axis 324 in stator housing 320. Stated another way, stator housing 320 may include an inner surface 334. Inner surface 334 may define a perimeter of a circular shape in a cross-sectional cut of stator housing 320 on a plane perpendicular to axis 324 (i.e., a longitudinal cross-section, as shown in FIGS. 5-6). Orifice 332 may be an undercut in inner surface 334 that extends radially along the entire perimeter.

FIG. 5 is a cross-sectional axial view diagram of an example stator housing 520 and a plurality of example orifices 532A-532N (together, orifices 532) formed in the stator housing 520, in accordance with the techniques of this disclosure. In some examples, the cross-sectional axial view of FIG. 5 may be substantially similar to cross section A-A shown in FIG. 3. Stator housing 520 includes cooling channels 528A-528N (together, cooling channels 528), each cooling channel of cooling channels 528 corresponding to an orifice of orifices 532. Stator housing 520 may be substantially similar to stator housing 320 of FIGS. 3 and 4. Other features of FIG. 5 may also be substantially similar to like-named features of previous figures. For example, cooling channels 528 may be substantially similar to cooling channels 328 of FIGS. 3 and 4.

A shape of stator housing 520 may define cooling channels 528. For example, cooling channels 528 may be defined by a plurality of spaces between external surface 536 of stator 522, and inner surface 534 of stator housing 520. External surface 536 of stator 522 may define an outer stator diameter $d_s$, and inner surface 534 of stator housing 520 may define an inner housing diameter $d_h$. Outer stator diameter $d_s$ and inner housing diameter $d_h$ may be substantially equal, given machining tolerances and tolerances for stator 522 to fit within an interior of stator housing 520. Cooling channels 528 may be defined by recesses in stator housing 520 in inner surface 534 along a portion of a longitudinal length of stator housing 520. The recesses forming cooling channels 528 may extend further outward from a center of the cross-section of FIG. 5 than the inner housing diameter $d_h$. In the example of FIG. 5, the cross-sections of cooling channels 528 are semi-circular in shape, however the cross-sections of cooling channels 528 may define any shape (e.g., square, rectangular). In some examples, cooling channels 528 may be formed by drilling into stator housing 520 in a longitudinal direction with respect to stator housing 520. In some examples, cooling channels 528 are evenly spaced around a circumference of the circle defined by inner housing diameter $d_h$. In some examples, cooling channels 528 are not evenly spaced. Although twelve cooling channels 528 are shown in FIG. 5, in some examples, cooling channels 528 may include any number of cooling channels.

Cooling channels 528 may be configured to receive a refrigerant to cool stator 522. For example, refrigerant may flow through cooling flow inlet 516 and into a distribution channel. From there, refrigerant may flow through orifices 532 and then into cooling channels 528. As refrigerant flows through cooling channels 528, heat may transfer from stator 522 to the refrigerant. Cooling channels 528 may be defined by the space between stator 522 and stator housing 520 such that as refrigerant flows through cooling channels 528, refrigerant comes in direct contact with stator 522 to increase heat exchange between stator 522 and the refrigerant. Portions of inner surface 534 of stator housing 520 may be in contact with external surface 536 of stator 522. Stator housing 520 may be configured to conduct heat away from stator 522 through the portions of inner surface 534 that contact external surface 536. These portions of inner surface 534 may also allow stator housing 520 to hold stator 522 in place.

Orifices 532 may be disposed between a distribution channel and cooling channels 528. Orifices 532 may be configured to restrict flow of the refrigerant from the distribution channel to cooling channels 528. In the example of FIG. 5, orifices 532 comprises a number of orifices equal to the number of cooling channels 528. Each orifice of orifices 532 corresponds to a cooling channel of cooling channels 528. For example, refrigerant may flow from distribution channel through orifice 532A and into cooling channel 528A. Orifices 532 may be sized sufficiently smaller than the distribution channel such that refrigerant may flow through the distribution channel to and through each orifice of orifices 532 and into each cooling channel of cooling channels 528. For example, orifices 532 may restrict fluid flow such that refrigerant is allowed to flow through the distribution channel to the portion of the distribution channel farthest away from cooling flow inlet 516 and remain sufficiently pressurized to urge through an orifice (e.g., orifice 532B) farthest away from cooling flow inlet 516 and thereafter through the cooling channel farthest away from cooling flow inlet 516 (e.g., cooling channel 528B). Orifices 532 may restrict the flow of refrigerant through orifices 532 with respect to flow of refrigerant through the distribution channel such that refrigerant may flow through each of orifices 532 and cooling channels 528.

FIG. 6 is a cross-sectional axial view diagram of an example stator housing 620 with an undercut 632 formed in the stator housing 620, in accordance with the techniques of this disclosure. In some examples, the cross-sectional axial view of FIG. 6 may be substantially similar to cross section A-A shown in FIG. 3. Features of FIG. 6 may be substantially similar to like-named features of previous figures. For example, cooling channels 628 may be substantially similar to cooling channels 528 of FIG. 5.

In the example of FIG. 6, the one or more orifices are defined by a single undercut 632 that acts as an orifice for each cooling channel of cooling channels 628. Undercut 632 in FIG. 6 represents an opening between cooling channels 628 and a distribution channel. For example, undercut 632 may include a single recess in inner surface 634 of stator housing 620 that extends around the entire inner circumference inner surface 634 of stator housing 620. That is, undercut 632 as shown in FIG. 6 may exist as an open space through an entire rotation about a center of the circle defined by inner surface 634.

The following numbered examples demonstrate one or more aspects of the disclosure.

Example 1: A rotary mechanical system, including: a motor; a housing, wherein the housing at least partially encloses one or more components of the motor; and a plurality of cooling channels defined by a plurality of spaces between an external surface of the motor and an inner surface of the housing, wherein the plurality of cooling channels are configured to receive a refrigerant to cool the motor.

Example 2: The rotary mechanical system of example 1, wherein the motor includes: a first longitudinal axis; and an outer stator diameter, wherein the housing includes: a second longitudinal axis substantially parallel with the first longitudinal axis; and an inner diameter substantially equal to the outer stator diameter, and wherein the plurality of cooling channels are defined by recesses in the housing on the inner diameter along the second longitudinal axis.

Example 3: The rotary mechanical system of example 2, wherein the plurality of cooling channels are evenly spaced around a circumference of the inner diameter of the housing.

Example 4: The rotary mechanical system of example 1, wherein the housing includes: a cooling flow inlet configured to receive the refrigerant; a distribution channel; and one or more orifices between the distribution channel and the plurality of cooling channels configured to restrict flow of the refrigerant from the distribution channel to the plurality of cooling channels.

Example 5: The rotary mechanical system of example 4, wherein the one or more orifices includes a plurality of orifices each corresponding to a respective cooling channel.

Example 6: The rotary mechanical system of example 4, wherein the housing includes: a length defining a longitudinal axis; and an inner surface, wherein a cross section of the inner surface perpendicular to the longitudinal axis defines a perimeter of a circle, wherein the one or more orifices includes a single undercut in the inner surface of the housing radially along an entirety of the perimeter.

Example 7: The rotary mechanical system of example 4, wherein the distribution channel is configured to act as a reservoir for the plurality of cooling channels, and wherein the one or more orifices are sized to allow the refrigerant to flow through each of the cooling channels.

Example 8: The rotary mechanical system of example 4, wherein the distribution channel includes a recess in the housing that extends along an entire inner circumference of the housing.

Example 9: The rotary mechanical system of example 1, wherein one or more inner surfaces of the housing are in contact with an external surface of the motor and configured to conduct heat away from the motor.

Example 10: The rotary mechanical system of example 1, wherein the rotary mechanical system is a compressor of a vapor cycle system, and wherein the compressor is configured to allow the refrigerant to enter the compressor at a compressor inlet after the refrigerant cools the motor.

Example 11: The rotary mechanical system of example 1, wherein the rotary mechanical system is a compressor of a vapor cycle system, wherein the housing includes a cooling flow inlet configured to receive the refrigerant from a condenser of the vapor cycle system.

Example 12: The rotary mechanical system of example 1, wherein a path of the refrigerant as it cools the motor travels around an entirety of a motor stator.

Example 13: The rotary mechanical system of example 1, wherein the motor defines a longitudinal axis, and wherein a path of the refrigerant as it cools the motor travels along the longitudinal axis on an external surface of a motor stator, curves around an end of the motor stator, and travels in an opposite direction along the longitudinal direction on an inner surface of the motor stator before exiting the housing.

Example 14: The rotary mechanical system of example 1, wherein the refrigerant is not electroconductive.

Example 15: The rotary mechanical system of example 1, further including: a cooling flow inlet configured to receive the refrigerant; and a control orifice within the cooling flow inlet configured to meter an amount of refrigerant that enters the housing.

Example 16: A vapor cycle system including: a condenser including a condenser outlet; a compressor, including: a motor; a housing, wherein the housing at least partially encloses one or more components of the motor; and a plurality of cooling channels defined by a plurality of spaces between an external surface of the motor and an inner surface of the housing, wherein the plurality of cooling channels are in fluid communication with the condenser outlet, and wherein the plurality of cooling channels are configured to receive a refrigerant from the condenser to cool the motor.

Example 17: The vapor cycle system of example 16, wherein the housing includes: a distribution channel; and one or more orifices between the distribution channel and the plurality of cooling channels configured to restrict flow of the refrigerant from the distribution channel to the plurality of cooling channels.

Example 18: The vapor cycle system of example 17, wherein the one or more orifices include a plurality of orifices each corresponding to a respective cooling channel.

Example 19: The vapor cycle system of example 17, wherein the housing includes: a length defining a longitudinal axis; and an inner surface, wherein a cross section of the inner surface perpendicular to the longitudinal axis defines a perimeter of a circle, wherein the one or more orifices includes a single undercut in the inner surface of the housing radially along entirety of the perimeter.

Example 20: The vapor cycle system of example 16, wherein one or more inner surfaces of the housing are in contact with an external surface of the motor and configured to conduct heat away from the motor.

Various examples have been described. These and other examples are within the scope of the following claims.

What is claimed is:

1. A rotary mechanical system, comprising:

a motor;

a housing, wherein the housing at least partially encloses one or more components of the motor, the housing comprising:

a cooling flow inlet configured to receive a refrigerant;

a distribution channel extending around at least a portion of a circumference of an inner diameter of the housing;

a plurality of orifices connected to the distribution channel; and a plurality of cooling channels defined by a plurality of spaces between an external surface of the motor and an inner surface of the housing, wherein each orifice of the plurality of orifices is configured to fluidically connect the distribution channel to a respective cooling channel of the plurality of cooling channels, wherein each cooling channel of the plurality of cooling channels is configured to receive refrigerant to cool the motor from the distribution channel via the respective orifice of the plurality of orifices, and wherein the plurality of orifices are configured to restrict flow of the refrigerant from the distribution channel into the plurality of orifices to cause flow of the refrigerant through a cooling channel of the plurality of cooling channels furthest away from the cooling flow inlet around the circumference of the housing.

2. The rotary mechanical system of claim 1, wherein the motor comprises:

a longitudinal axis; and an outer stator diameter, wherein the inner diameter of the housing is:

equal to the outer stator diameter, and wherein the plurality of cooling channels are defined by recesses in the housing on the inner diameter extending along the longitudinal axis.

3. The rotary mechanical system of claim 1, wherein the plurality of cooling channels are evenly spaced around the circumference of the inner diameter of the housing, and wherein the cooling channel of the plurality of cooling channels furthest away from the cooling flow inlet is radially opposite to the cooling flow inlet around the circumference of the inner diameter of the housing.

4. The rotary mechanical system of claim 1, wherein the housing comprises:

a length defining a longitudinal axis; and an inner surface, wherein a cross section of the inner surface perpendicular to the longitudinal axis defines a perimeter of a circle, wherein the plurality of orifices are defined by a single undercut in the inner surface of the housing extending along an entirety of the perimeter.

5. The rotary mechanical system of claim 1, wherein the distribution channel retains the refrigerant as a reservoir for the plurality of cooling channels, and wherein the plurality of orifices are sized to allow the refrigerant to flow through each of the plurality of cooling channels.

6. The rotary mechanical system of claim 1, wherein the distribution channel extends along an entire inner circumference of the housing.

7. The rotary mechanical system of claim 1, wherein one or more inner surfaces of the housing are in contact with an external surface of the motor and configured to conduct heat away from the motor.

8. The rotary mechanical system of claim 1, wherein the rotary mechanical system is a compressor of a vapor cycle system, and wherein the compressor is configured to allow the refrigerant to enter the compressor at a compressor inlet after the refrigerant cools the motor.

9. The rotary mechanical system of claim 1, wherein the rotary mechanical system is a compressor of a vapor cycle system, wherein the housing comprises a cooling flow inlet configured to receive the refrigerant from a condenser of the vapor cycle system.

10. The rotary mechanical system of claim 1, wherein a path of the refrigerant as it cools the motor travels around an entirety of a motor stator.

11. The rotary mechanical system of claim 1, wherein the motor defines a longitudinal axis, and wherein a path of the refrigerant as it cools the motor travels along the longitudinal axis on an external surface of a motor stator, curves around an end of the motor stator, and travels in an opposite direction along the longitudinal direction on an inner surface of the motor stator before exiting the housing.

12. The rotary mechanical system of claim 1, wherein the refrigerant is not electroconductive.

13. The rotary mechanical system of claim 1, further comprising:

a cooling flow inlet configured to receive the refrigerant; and a control orifice within the cooling flow inlet configured to meter an amount of refrigerant that enters the housing.

14. The rotary mechanical system of claim 1, wherein the plurality of orifices are configured to restrict flow of the refrigerant from the distribution channel into the plurality of orifices to cause the distribution channel to be entirely filled with the refrigerant.

15. A vapor cycle system comprising:

a condenser comprising a condenser outlet;

a compressor, comprising:

a motor;

a housing, wherein the housing at least partially encloses one or more components of the motor, the housing comprising:

a cooling flow inlet configured to receive a refrigerant;

a distribution channel extending around at least a portion of a circumference of an inner diameter of the housing;

a plurality of orifices connected to the distribution channel; and a plurality of cooling channels defined by a plurality of spaces between an external surface of the motor and an inner surface of the housing, wherein each orifice of the plurality of orifices is fluidically connected to a respective cooling channel of the plurality of cooling channels, wherein the plurality of cooling channels are in fluid communication with the condenser, wherein each cooling channel of the plurality of cooling channels is configured to receive the refrigerant from the condenser via the distribution channel and the respective orifice of the plurality of orifices to cool the motor, and wherein the plurality of orifices are configured to restrict flow of the refrigerant from the distribution channel into the plurality of orifices to cause flow of the refrigerant through a cooling channel of the plurality of cooling channels furthest away from the cooling flow inlet around the circumference of the housing.

16. The vapor cycle system of claim 15, wherein the housing comprises:

a length defining a longitudinal axis; and an inner surface, wherein a cross section of the inner surface perpendicular to the longitudinal axis defines a perimeter of a circle, wherein the plurality of orifices are defined by a single undercut in the inner surface of the housing extending along an entirety of the perimeter.

17. The vapor cycle system of claim 15, wherein one or more inner surfaces of the housing are in contact with an external surface of the motor and configured to conduct heat away from the motor.

18. The vapor cycle system of claim 15, wherein the plurality of cooling channels are evenly spaced around the circumference of the inner diameter of the housing, and wherein the cooling channel of the plurality of cooling channels furthest away from the cooling flow inlet is radially opposite to the cooling flow inlet around the circumference of the inner diameter of the housing.

19. The vapor cycle system of claim 15, wherein the distribution channel retains the refrigerant as a reservoir for the plurality of cooling channels, and wherein the plurality of orifices are sized to allow the refrigerant to flow through each of the plurality of cooling channels.

20. The vapor cycle system of claim 15, wherein the distribution channel extends along an entire inner circumference of the housing.

* * * * *